(12) United States Patent
Lin et al.

(10) Patent No.: US 10,883,942 B2
(45) Date of Patent: Jan. 5, 2021

(54) FULL-SERVO LABEL INSPECTION MACHINE AND CONTROL METHOD THEREOF

(71) Applicant: Guangzhou Pulisi Technology Co., Ltd., Guangdong (CN)

(72) Inventors: Xiaobo Lin, Guangdong (CN); Lu Liu, Guangdong (CN)

(73) Assignee: Guangzhou Pulisi Technology Co., Ltd., Guangzhou (CN)

( * ) Notice: Subject to any disclaimer, the term of this patent is extended or adjusted under 35 U.S.C. 154(b) by 95 days.

(21) Appl. No.: 16/389,948

(22) Filed: Apr. 20, 2019

(65) Prior Publication Data

US 2020/0200687 A1 Jun. 25, 2020

(30) Foreign Application Priority Data

Dec. 24, 2018 (CN) .......................... 2018 1 1580839

(51) Int. Cl.
| | |
|---|---|
| *G01N 21/88* | (2006.01) |
| *B41F 15/12* | (2006.01) |
| *B41F 15/34* | (2006.01) |
| *B41F 27/00* | (2006.01) |
| *B41F 33/00* | (2006.01) |
| *B41F 33/16* | (2006.01) |

(52) U.S. Cl.
CPC ......... *G01N 21/8803* (2013.01); *B41F 15/12* (2013.01); *B41F 15/34* (2013.01); *B41F 27/005* (2013.01); *B41F 33/0036* (2013.01); *B41F 33/16* (2013.01); *B41P 2251/00* (2013.01)

(58) Field of Classification Search
CPC ..... G01N 21/8803; B41F 15/12; B41F 15/34; B41F 27/005; B41F 33/0036; B41F 33/16; B41P 2251/00; B65C 9/26; B65C 9/40
See application file for complete search history.

(56) References Cited

U.S. PATENT DOCUMENTS

| | | | | |
|---|---|---|---|---|
| 5,682,473 A | * | 10/1997 | Carson | G06F 11/3604 714/38.1 |
| 6,185,001 B1 | * | 2/2001 | Webendorfer | G06K 15/00 347/19 |
| 8,711,350 B2 | * | 4/2014 | Motter | G01N 21/93 356/240.1 |
| 8,776,857 B1 | * | 7/2014 | Jackson | B41J 3/4075 156/767 |
| 2006/0144521 A1 | * | 7/2006 | Esposito | B65C 9/188 156/361 |

(Continued)

*Primary Examiner* — John B Strege

(57) ABSTRACT

The present invention provide a full-servo label inspection machine and a control method thereof; the machine includes a frame, the frame is provided with an unrolling mechanism, a rolling mechanism, a visual inspection mechanism, a label removal mechanism, and a label replacement mechanism. In the label removal mechanism, when the paper pressing roller is at the label removal position, it presses the material to be inspected downwards to form an angle of less than 180° with the rear end of a label removal plate. After a defective label on the material to be inspected passes the label removal plate, a front end of the defective label curls up and eventually sticks onto the label removal paper. The present invention allows fully automation of the removal and replacement of labels, achieving high inspection efficiency and accuracy.

20 Claims, 5 Drawing Sheets

(56) References Cited

U.S. PATENT DOCUMENTS

| | | | |
|---|---|---|---|
| 2014/0117084 A1* | 5/2014 | Wooldridge | G06K 7/0013 |
| | | | 235/375 |
| 2017/0232770 A1* | 8/2017 | Akiyama | G01N 21/84 |
| | | | 347/51 |
| 2018/0186496 A1* | 7/2018 | Mevada | B65C 9/1865 |
| 2019/0057499 A1* | 2/2019 | Dekel-Klein | G06K 15/027 |
| 2019/0196764 A1* | 6/2019 | Furukawa | B65C 9/46 |
| 2019/0224963 A1* | 7/2019 | Numauchi | G01N 21/8806 |
| 2019/0300222 A1* | 10/2019 | Iadonisi | G01N 21/8806 |
| 2019/0308220 A1* | 10/2019 | Sun | B65C 9/30 |
| 2020/0071015 A1* | 3/2020 | Fan | B65C 9/26 |
| 2020/0072759 A1* | 3/2020 | Kawai | H04N 1/00039 |
| 2020/0223574 A1* | 7/2020 | Tong | B65B 57/04 |

\* cited by examiner

FULL-SERVO LABEL INSPECTION MACHINE AND CONTROL METHOD THEREOF

CROSS-REFERENCE TO RELATED APPLICATIONS

The present application claims the benefit of Chinese Patent Application No. 201811580839.1 filed on Dec. 24, 2018. The contents of the above are hereby incorporated by reference.

FIELD OF THE INVENTION

The invention relates to the technical field of printing devices, in particular to a full-servo label inspection machine and a control method thereof.

BACKGROUND OF THE INVENTION

In the printing of rolls of different media, printing defects frequently occur. Therefore, quality management is crucial. When printing roll labels, the replacement of defective labels is usually performed manually. This is because the automatic removal and replacement of labels require high-precision positioning, which can be hard to achieve. The manual removal and replacement of labels mainly have the following drawbacks:

1. High labor cost and labor intensity; low efficiency;
2. Difficult for quality control and may potentially lead to accidents.

SUMMARY OF THE INVENTION

The objective of the present invention is to overcome the deficiencies of the prior art and to provide a full-servo label inspection machine which can automatically remove and replace labels at high efficiency.

To achieve the objective above, a first aspect of the present invention is to provide a full-servo label inspection machine, which includes a frame, the frame is provided with an unrolling mechanism, a rolling mechanism, a visual inspection mechanism, a label removal mechanism, and a label replacement mechanism; one end of a material to be inspected winds around the unrolling mechanism; the material to be inspected sequentially passes the visual inspection mechanism, the label removal mechanism, and the label replacement mechanism; the other end of the material to be inspected winds around the rolling mechanism;

the label removal mechanism includes a waste label traction mechanism and a label removal triggering mechanism; a label removal paper, which has a sticky outer surface, winds around the waste label traction mechanism; the label removal triggering mechanism includes a drive component, a label removal plate, and a paper pressing roller; the label removal plate and the paper pressing roller are respectively provided at both sides of the material to be inspected;

the drive component is capable of driving the paper pressing roller to switch between a standby position and a label removal position; the paper pressing roller is not in contact with the material to be inspected when the paper pressing roller is at the standby position; when the paper pressing roller is at the label removal position, it presses the material to be inspected downwards so that the material to be inspected abuts a rear end of the label removal plate and forms an angle of less than 180° between the material to be inspected and the rear end of the label removal plate; after a defective label on the material to be inspected passes the label removal plate, a front end of the defective label curls up; when the defective label is in contact with the label removal paper, it sticks onto the label removal paper; a blank position is consequently formed at the position where the defective label is removed from the material to be inspected;

the full-servo label inspection machine further includes a controller, the controller is electrically connected to the visual inspection mechanism, the drive component, and the label replacement mechanism.

As a preferred embodiment, the drive component includes a drive motor, a slider-crank mechanism, a first connecting rod, and a push rod; the slider-crank mechanism includes a crank, a second connecting rod, and a slider; one end of the crank is connected to a power output end of the drive motor, another end of the crank is connected to one end of the second connecting rod; another end of the second connecting rod is connected to the slider; one end of the first connecting rod is connected to the slider; another end of the first connecting rod is connected to a first end of the push rod; the paper pressing roller is mounted on a second end of the push rod;

the frame is provided with a guide rail which guides the movement of the slider; a limiting mechanism is sleeved on the push rod, the limiting mechanism restricts the push rod to only slide along a straight line.

As a preferred embodiment, the limiting mechanism is a linear bearing which is mounted on the frame.

As a preferred embodiment, the label removal triggering mechanism includes a pressing block and a spring; the paper pressing roller is connected to the push rod through the pressing block; the spring is sleeved on the push rod; one end of the spring abuts the label removal plate; another end of the spring abuts the pressing block.

As a preferred embodiment, the waste label traction mechanism includes a waste label unrolling reel and a waste label rolling reel; one end of the label removal paper winds around the waste label unrolling reel; another end of the label removal paper winds around the waste label rolling reel.

As a preferred embodiment, the label replacement mechanism includes a label replacement traction mechanism and a label replacement plate mounted on the frame; a label replacement paper winds around the label replacement traction mechanism, the label replacement paper is provided with a replacement label; the label replacement plate has an end with a pointed shape, the end with the pointed shape is proximal to the material to be inspected; the label replacement paper travels pass the end with the pointed shape of the label replacement plate;

when the label replacement paper travels pass the end with the pointed shape of the label replacement plate, the replacement label on the label replacement paper is peeled off from the label replacement paper and is adhered to the blank position on the material to be inspected.

As a preferred embodiment, the label replacement mechanism further includes a sensor disposed near the rear end of the label replacement plate; the sensor is electrically connected to the controller and can detect the blank position on the material to be inspected.

As a preferred embodiment, the label replacement traction mechanism includes a label replacement unrolling reel and a label replacement rolling reel; one end of the label replacement paper winds around the label replacement unrolling reel; another end of the label replacement paper winds around the label replacement rolling reel.

As a preferred embodiment, the full-servo label inspection machine further includes at least one corrector mounted on the frame; the corrector is provided between the unrolling mechanism and the rolling mechanism.

As a preferred embodiment, the full-servo label inspection machine further includes a slitting mechanism mounted on the frame; the slitting mechanism is provided between the label replacement mechanism and the rolling mechanism.

As a preferred embodiment, the full-servo label inspection machine further includes a human-computer interaction device and a display screen; the human-computer interaction device and the display screen are electrically connected to the controller.

To achieve the same objective as mentioned above, a second aspect of the present invention involves a control method for the full-servo label inspection machine, which comprises the following steps:

acquiring image information of a label on a material to be inspected by a visual inspection mechanism; transmitting the image information to a controller;

analyzing and judging the image information by the controller;

pressing a paper pressing roller downwards onto the material to be inspected when the image information corresponds to a defective label so that the defective label adheres to a label removal paper;

activating a label replacement mechanism when a blank position on the material to be inspected is at the label replacement mechanism, in order to place a replacement label from the label replacement paper to the blank position on the material to be inspected.

Comparing to the prior art, the advantageous effects of the present invention are as follows.

The present invention provides a full-servo label inspection machine, which includes a controller and a visual inspection mechanism, a label removal mechanism, and a label replacement mechanism connected to the controller. The controller can accurately locate the defective label on the material to be tested; the label removal mechanism is then employed to remove the defective label and the label replacement mechanism is employed to accurately place a replacement label on the blank position created as a result of the removal of the defective label. This allows full automation of the removal and replacement of labels, achieving high working efficiency and quality.

Figure 1:
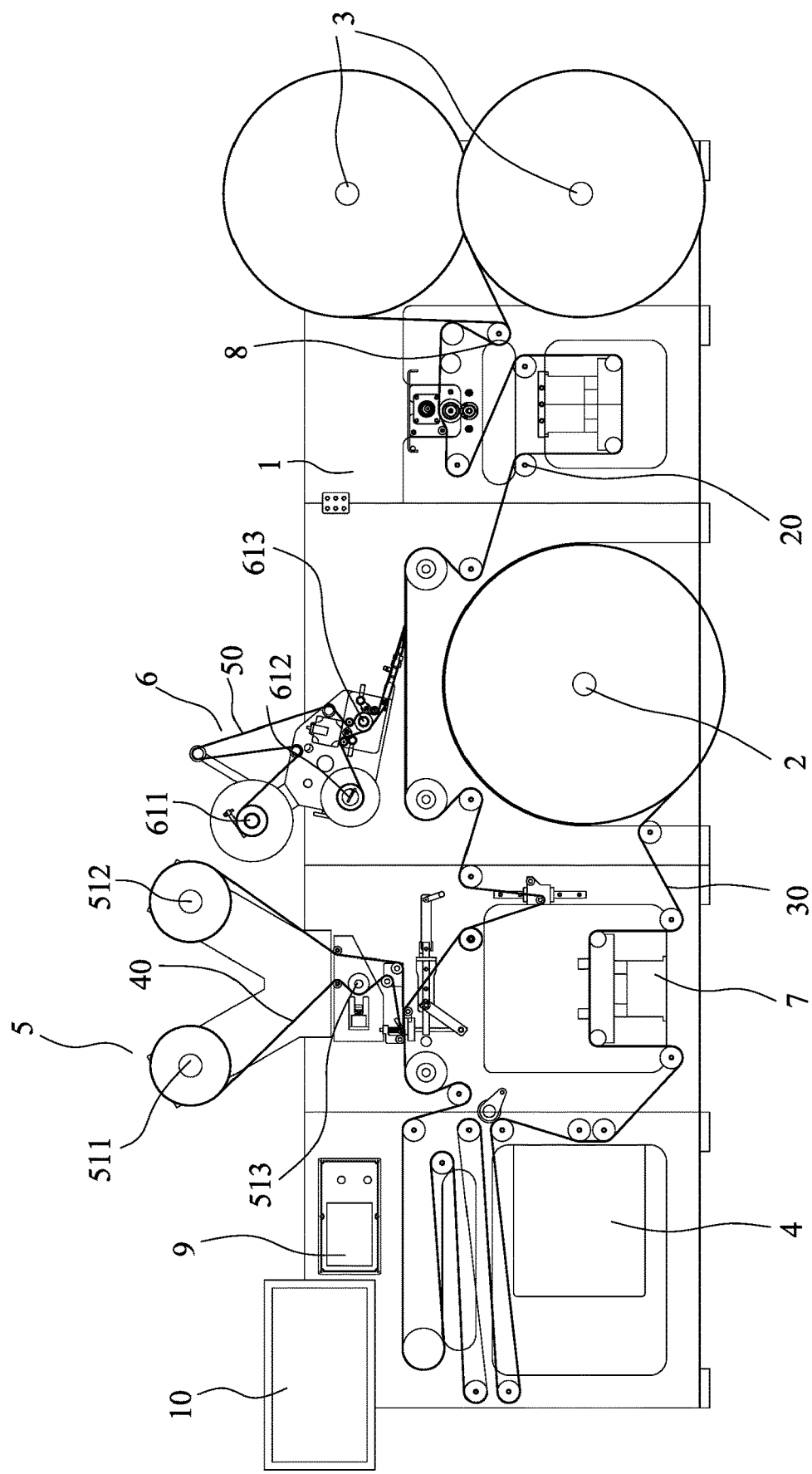
FIG. 1 is a schematic diagram of a full-servo label inspection machine of an embodiment of the present invention.

In the figures: 1—frame; 11—guide rail; 2—unrolling mechanism; 3—rolling mechanism; 4—visual inspection mechanism; 5—label removal mechanism; 51—waste label traction mechanism; 511—waste label unrolling reel; 512—waste label rolling reel; 513—second guiding roller; 52—label removal triggering mechanism; 521—label removal plate; 522—paper pressing roller; 523—crank; 524—second connecting rod; 525—slider; 526—first connecting rod; 527—push rod; 528—linear bearing; 529—pressing block; 530—spring; 6—label replacement mechanism; 61—label replacement traction mechanism; 611—label replacement unrolling reel; 612—label replacement rolling reel; 613—third guiding roller; 62—label replacement plate; 7—corrector; 8—slitting mechanism; 9—human-computer interaction device; 10—display screen; 20—first guiding roller; 30—material to be inspected; 40—label removal paper; 50—label replacement paper.

DETAILED DESCRIPTION OF THE ILLUSTRATED EMBODIMENTS

The present invention is further described in detail below with reference to the accompanying drawings and embodiments. The following embodiments are intended to illustrate the present invention but are not intended to limit the scope of the present invention.

In the description of the present invention, it should be understood that the orientation or position relationships indicated by the terms "upper", "lower", "left", "right", "top", "bottom", and the like are based on the accompanying drawings and are merely for the purpose of illustrating the present invention in a simplified manner. They are not intended to indicate or imply that the device or components must have a particular orientation or should be constructed and operated in a particular orientation. Therefore, these terms should not be understood as limiting the invention in any way. It should be understood that the terms "first", "second", and the like are used in the present invention to describe various information, but the information should not be limited to these terms, and these terms are only used to distinguish the same type of information from each other. For example, without departing from the scope of the invention, the "first" information may also be referred to as the "second" information; similarly, the "second" information may also be referred to as the "first" information.

In addition, it should be noted that the terms "front end", "rear end", and the like are based on the direction of the traveling route of the material to be inspected. The "front end" refers to a position close to the rolling mechanism; the term "rear end" refers to a position close to the unrolling mechanism.

As shown in FIG. 1 to FIG. 4, a preferred embodiment of the first aspect of the present invention involves a full-servo label inspection machine, which includes a frame 1; the frame 1 is provided with an unrolling mechanism 2, a rolling mechanism 3, a visual inspection mechanism 4, a label removal mechanism 5, and a label replacement mechanism 6. One end of the material to be inspected 30 winds around the unrolling mechanism 2; the material to be inspected 30 sequentially passes the visual inspection mechanism 4, the label removal mechanism 5, and the label replacement mechanism 6; the other end of the material to be inspected 30 winds around the rolling mechanism 3.

The label removal mechanism 5 includes a waste label traction mechanism 51 and a label removal triggering mechanism 52. A label removal paper 40, which has a sticky outer surface, winds around the waste label traction mechanism 51. The label removal triggering mechanism 52 includes a drive component, a label removal plate 521, and a paper pressing roller 522; the label removal plate 521 and the paper pressing roller 522 are respectively provided at both sides of the material to be inspected 30.

The drive component is capable of driving the paper pressing roller 522 to switch between a standby position and a label removal position. The paper pressing roller 522 is not in contact with the material to be inspected 30 when the paper pressing roller 522 is at the standby position. When the paper pressing roller 522 is at the label removal position, it presses the material to be inspected 30 downwards so that the material to be inspected 30 abuts the rear end of the label removal plate 521 and forms an angle of less than 180° at the rear end of the label removal plate 521. In this way, after a defective label on the material to be inspected 30 passes the label removal plate 521, the front end of the defective label curls up. When the defective label is in contact with the label removal paper 40, it sticks onto the label removal paper 40; as a result, a blank position is formed at the position where the defective label is removed from the material to be inspected 30. In this embodiment, the coordination between the paper pressing roller 522 and the label removing plate 521 allows the accurate removal of defective labels from the material to be inspected 30.

In order to achieve automatic control, the full-servo label inspection machine further includes a controller. The controller is electrically connected to the visual inspection mechanism 4, the drive component, and the label replacement mechanism 6. The controller allows the identification and positioning of the defective label through the visual inspection mechanism 4; it also controls the drive component to remove the defective label on the material to be inspected 30. In addition, the controller can control the operation of the label replacement mechanism 6 to precisely place replacement labels onto the blank position on the material to be inspected 30 after the defective label is removed. In this way, fully automatic operation can be achieved and the accuracy of label removal/replacement can be improved.

Based on the technical solution above, the present embodiment provides a full-servo label inspection machine, wherein the frame 1 acts as support; one end of the material to be inspected 30 winds around the unrolling mechanism 2 and the material is continuously fed to other parts of the machine through the rotation of the unrolling mechanism 2. After the material to be inspected 30 passes the visual inspection mechanism 4, the label removal mechanism 5, and the label replacement mechanism 6, it is finally collected into a roll by the rolling mechanism 3. The operation process is as follows: when the material to be inspected 30 passes the visual inspection mechanism 4, the visual inspection mechanism 4 is triggered to take a picture, the detection result is transmitted to the controller for analysis. When a defective label is identified, it is transported to the label removal mechanism 5. At this time, the drive component is switched on, allowing the paper pressing roller 522 to move from the standby position to the label removal position. The paper pressing roller 522 presses the material to be inspected downwards so that the back side of the material to be inspected 30 abuts the rear end of the label removal plate 512 at a position corresponding to the position of the defective label. Under the action of the label removal plate 521, an angle of 180° is formed at the paper movement route of the material to be inspected 30. As a result, the front end of the defective label curls up. As the defective label travels forward, it is detached from the material to be inspected 30 and then adheres to the label removal plate 40. The removal of the defective label creates a blank position on the material to be inspected 30. When the blank position arrives at the label replacement mechanism 6, a replacement label is placed on the blank position. After label removal and replacement, the material to be inspected 30 is finally collected into a roll by the rolling mechanism 3.

Illustratively, in the present embodiment, a plurality of first guiding rollers 20 are provided on the paper movement route of the material to be inspected 30. The first guiding rollers 20 guide the material to be inspected 30, ensuring that the material to be inspected 30 travels along the desired path.

Figure 2:
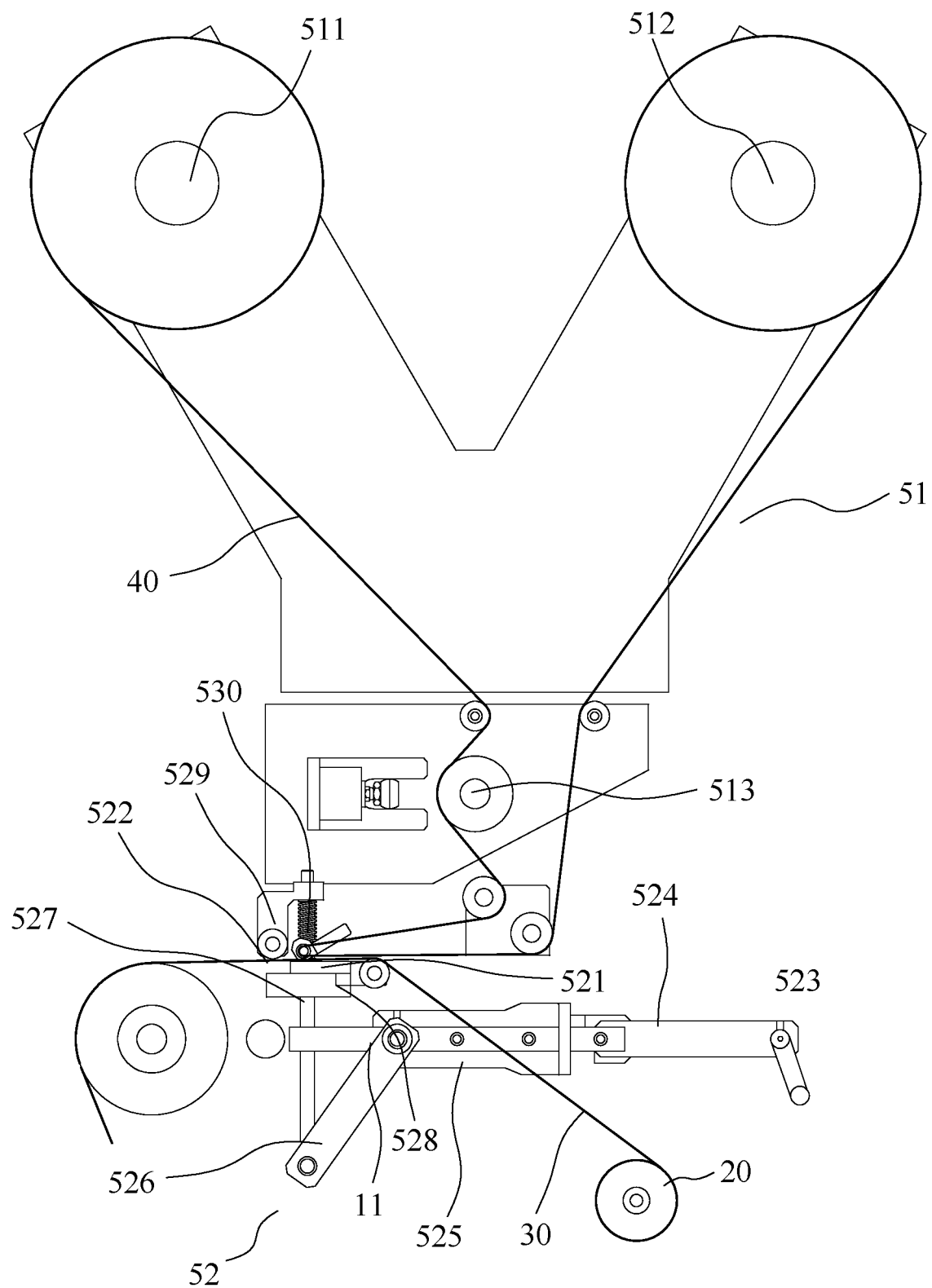
FIG. 2 is a schematic diagram of a label removal mechanism of a full-servo label inspection machine of an embodiment of the present invention; the paper pressing roller is at its standby position.
Figure 3:
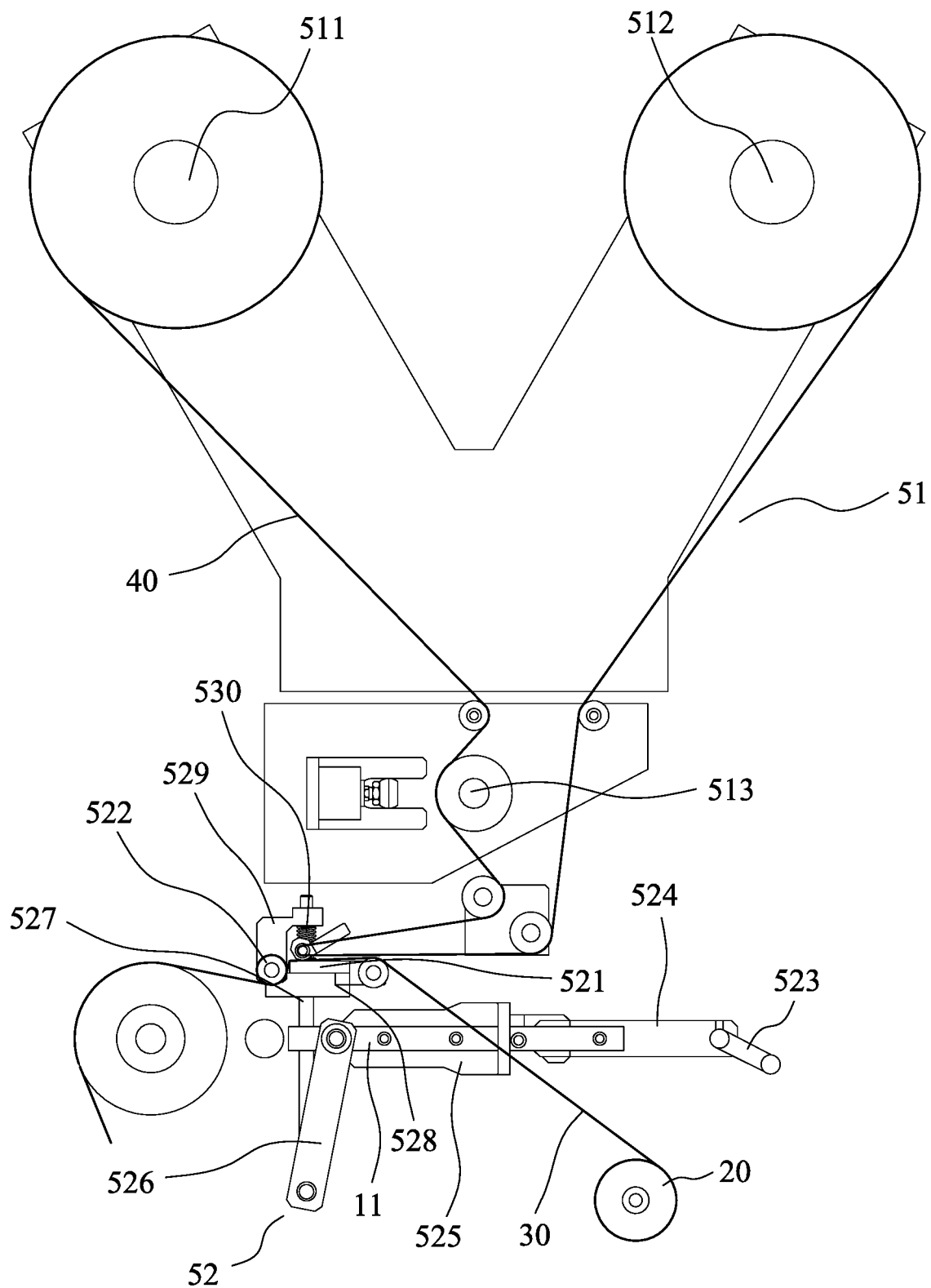
FIG. 3 is a schematic diagram of a label removal mechanism of a full-servo label inspection machine of an embodiment of the present invention; the paper pressing roller is at its label removal position.

Specifically, please refer to FIG. 2 and FIG. 3. In the present embodiment, the drive component includes a drive motor (not shown in the drawings), a slider-crank mechanism, a first connecting rod 526, and a push rod 527. The slider-crank mechanism includes a crank 523, a second connecting rod 524, and a slider 525. One end of the crank 523 is connected to a power output end of the drive motor, the other end of the crank 523 is connected to one end of the second connecting rod 524; the other end of the second connecting rod 524 is connected to the slider 525. One end of the first connecting rod 526 is connected to the slider 525; the other end of the first connecting rod 526 is connected to the first end of the push rod 527; the paper pressing roller 522 is mounted on the second end of the push rod 527. The frame 1 is provided with a guide rail 11. The guide rail 11 guides the movement of the slider 525. A limiting mechanism is sleeved on the push rod 527, which restricts the push rod 527 to only slide along a straight line.

FIG. 2 shows the state of the paper pressing roller 522 at the standby position, in which the paper pressing roller 522 is not in contact with the material 30 to be inspected. FIG. 3 shows the state of the paper pressing roller 522 at the label removal position. When the paper pressing roller 522 moves from the standby position to the label removal position, the drive motor operates and drives the movement of the slider-crank mechanism, pushing the slider 525 to the left. Consequently, the upper end of the first connecting rod 526 is pushed to the left and the first connecting rod 526 rotates counterclockwise, finally driving the downward movement of the paper pressing roller 522. The paper pressing roller 522 presses the material to be inspected 30 downwards so that the material to be inspected 30 forms an angle of less than 180° with the rear end corner of the label removal plate 521, allowing the removal of the defective label. When the drive motor is operated in a reversed direction, the paper pressing roller 522 moves back to the standby position.

Preferably, in the present embodiment, the limiting mechanism is a linear bearing 528 which is mounted on the frame 1; the push rod 527 passes through the linear bearing 528 and the linear bearing 528 restricts the push rod 527 to only move up and down.

In addition, the label removal triggering mechanism 52 includes a pressing block 529 and a spring 530. The paper pressing roller 522 is coupled to the push rod 527 through the pressing block 529. The spring 530 is sleeved on the push rod 527. One end of the spring 530 abuts the label removal plate 521; the other end of the spring 530 abuts the pressing block 529. Through the action of the spring 530, the pressing roller 522 and the push rod 527 can automatically return to their initial position.

Specifically, the waste label traction mechanism 51 includes a waste label unrolling reel 511 and a waste label rolling reel 512. One end of the label removal paper 40 winds around the waste label unrolling reel 511; the other end of the label removal paper 40 winds around the waste label rolling reel 512. The rotation of the waste label unrolling reel 511 leads to the directional movement of the label removal paper 40, which allows the curled-up defective label on the label removal plate 521 to adhere to the label removal paper 40; eventually, the label removal paper 40 is collected into a roll by the waste label rolling reel 512.

Illustratively, in the present embodiment, a number of second guiding rollers 513 are provided on the paper movement route of the label removal paper 40. The second guiding rollers 513 guide the direction of movement of the label removal paper 40, ensuring that the label removal paper 40 travels along the desired route.

Figure 4:
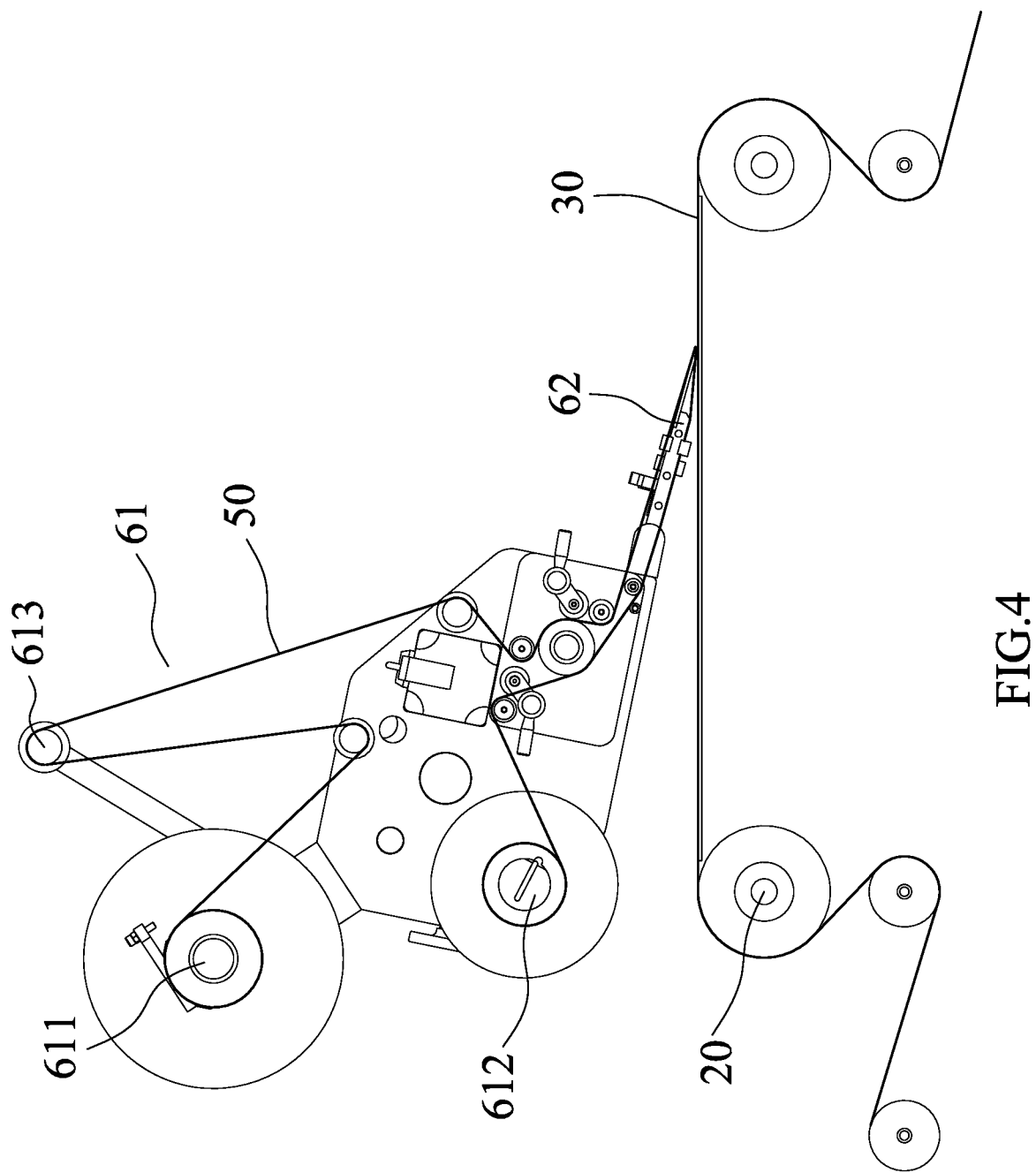
FIG. 4 is a schematic diagram of a label replacement mechanism of a full-servo label inspection machine of an embodiment of the present invention.

Specifically, referring to FIG. 4, the label replacement mechanism 6 includes a label replacement traction mechanism 61 and a label replacement plate 62 mounted on the frame 1. A label replacement paper 50 winds around the label replacement traction mechanism 611, the label replacement paper 50 is provided with a replacement label. The label replacement plate 62 has an end with a pointed shape; this end with the pointed shape is proximal to the material to be inspected 30. The label replacement paper 50 travels past the end with the pointed shape of the label replacement plate 62. When the label replacement paper 50 travels past the end with the pointed shape, the replacement label is peeled off from the label replacement paper 50 and then adheres to the blank position on the material to be inspected 30.

Furthermore, in order to accurately position the supplementary label on the blank position of the material to be inspected 30, the label replacement mechanism 6 further includes a sensor (not shown in the drawings) disposed near the rear end of the label replacement plate 62. The sensor is electrically connected to the controller and can detect a blank position on the material to be inspected 30. When the sensor detects the presence of a blank position, the label replacement traction mechanism 61 operates to move the label replacement paper 50 thereon forward; the replacement label is then adhered to the blank position of the material to be inspected 30.

Specifically, in the present embodiment, the label replacement traction mechanism 61 includes a label replacement unrolling reel 611 and a label replacement rolling reel 612. One end of the label replacement paper 50 winds around the label replacement unrolling reel 611; the other end of the label replacement paper 50 winds around the label replacement rolling reel 612. The rotation of the label replacement unrolling reel 611 leads to the directional movement of the label replacement paper 50. The label replacement paper 50, with the replacement labels peeled off, is then collected into a roll by the label replacement rolling reel 612.

Illustratively, in the present embodiment, a number of third guiding rollers 613 are provided at the paper movement route of the label replacement paper 50. The third guiding rollers 613 guide the direction of movement of the label replacement paper 50, ensuring that the label replacement paper 50 travels along the desired route.

In order to control and adjust the paper movement route of the material to be inspected 30, the full-servo label inspection machine of the present embodiment further includes at least one corrector 7 mounted on the frame 1. The corrector 7 is provided between the unrolling mechanism 2 and the rolling mechanism 3. As shown in FIG. 1, the correcting device 7 is disposed between the unrolling mechanism 2 and the visual inspection mechanism 4.

As shown in FIG. 1, the full-servo label inspection machine further includes a slitting mechanism 8 mounted on the frame 1. The slitting mechanism 8 is disposed between the label replacement mechanism 6 and the rolling mechanism 3. The slitting mechanism 8 is able to cut the material to be inspected into two parts or a number of parts, effectively improving efficiency.

In order to facilitate operation and inspection, the full-servo label inspection machine further includes a human-computer interaction device 9 and a display screen 10. The human-computer interaction device 9 and the display screen 10 are electrically connected to the controller. Device parameters, such as the paper movement speed of the material to be inspected 30, can be set in the human-computer interaction device 9.

Figure 5:
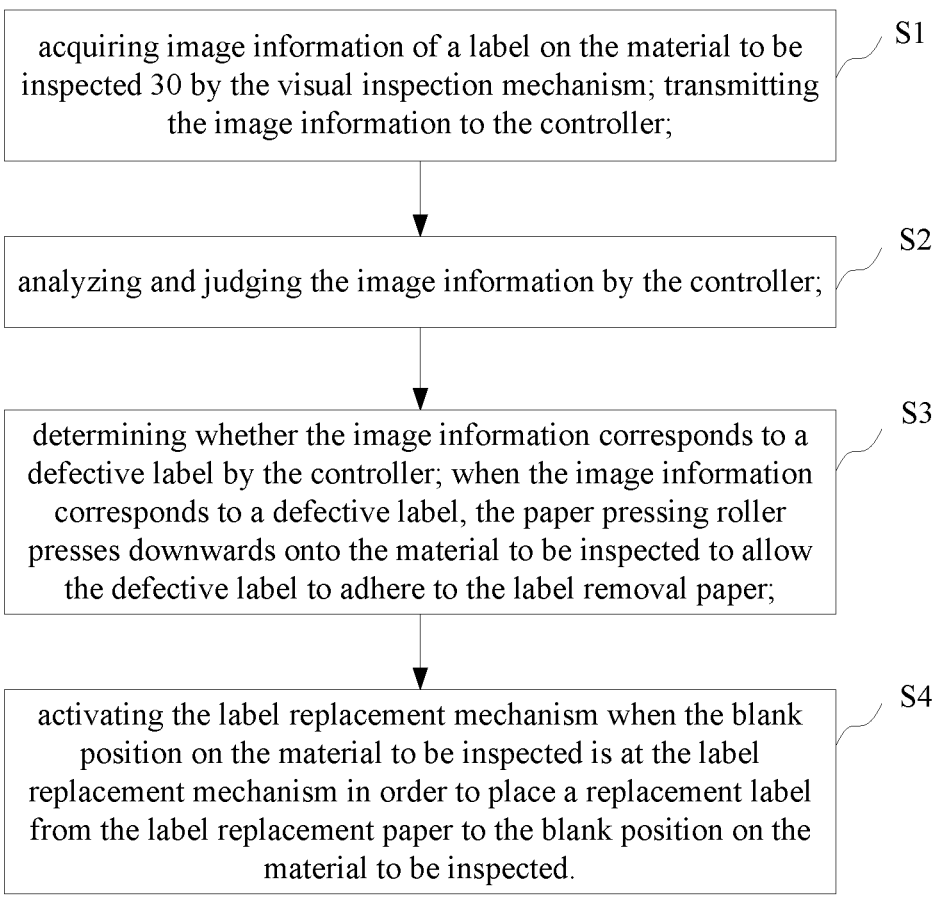
FIG. 5 is a schematic flow chart of a control method for a full-servo label inspection machine of an embodiment of the present invention.

In order to achieve the same objective, an embodiment of a second aspect of the present invention provides a control method based on the full-servo label inspection machine. Referring to FIG. 5, the method specifically includes the following steps:

S1: acquiring image information of a label on the material to be inspected 30 via photography performed by the visual inspection mechanism 4; transmitting the image information to the controller.

S2: analyzing and judging the image information by the controller.

S3: determining whether the image information corresponds to a defective label by the controller; when the image information corresponds to a defective label, the paper pressing roller 522 presses downwards onto the material to be inspected 30 to allow the defective label to adhere to the label removal paper 40; when the image information corresponds to a normal label, the material to be inspected 30 moves forward as normal.

S4: activating the label replacement mechanism 6 when the blank position on the material to be inspected 30 is at the label replacement mechanism 6 in order to place a replacement label from the label replacement paper 50 to the blank position on the material to be inspected 30.

In the control method based on the full-servo label inspection machine described above, the material to be inspected 30 sequentially passes the visual inspection mechanism 4, the label removal mechanism 5, and the label replacement mechanism 6 to respectively identify, remove and replace the labels. By controlling the operation of each component through the controller, full automation, high inspection efficiency, and high inspection accuracy can be achieved.

In summary, the embodiments of the present invention provide a full-servo label inspection machine and a control method thereof. The full-servo label inspection machine includes a controller and a visual inspection mechanism 4, a label removal mechanism 5, and a label replacement mechanism 6 connected to the controller. The controller can accurately locate the defective label on the material to be tested 30; the label removal mechanism 5 is then employed to remove the defective label and the label replacement mechanism 6 is employed to accurately place a replacement label on the blank position created as a result of the removal of the defective label. This allows full automation of the removal and replacement of labels, achieving high working efficiency and quality.

The above is only a preferred embodiment of the present invention. It should be noted that those skilled in the art can make improvements and substitutions without departing from the technical principles of the present invention. These improvements and substitutions should also be considered as within the scope of protection of the present invention.

What is claimed is:

1. A full-servo label inspection machine, wherein it includes a frame, the frame is provided with an unrolling mechanism, a rolling mechanism, a visual inspection mechanism, a label removal mechanism, and a label replacement mechanism; one end of a material to be inspected winds around the unrolling mechanism; the material to be inspected sequentially passes the visual inspection mechanism, the label removal mechanism, and the label replacement mechanism; another end of the material to be inspected winds around the rolling mechanism;

the label removal mechanism includes a waste label traction mechanism and a label removal triggering mechanism; a label removal paper, which has a sticky outer surface, winds around the waste label traction mechanism; the label removal triggering mechanism includes a drive component, a label removal plate, and a paper pressing roller; the label removal plate and the paper pressing roller are respectively provided at both sides of the material to be inspected;

the drive component is capable of driving the paper pressing roller to switch between a standby position and a label removal position; the paper pressing roller is not in contact with the material to be inspected when the paper pressing roller is at the standby position; when the paper pressing roller is at the label removal position, it presses the material to be inspected downwards so that the material to be inspected abuts a rear end of the label removal plate and forms an angle of less than 180° between the material to be inspected and the rear end of the label removal plate; after a defective label on the material to be inspected passes the label removal plate, a front end of the defective label curls up; when the defective label is in contact with the label removal paper, it sticks onto the label removal paper; a blank position is consequently formed at a position where the defective label is removed from the material to be inspected;

the full-servo label inspection machine further includes a controller, the controller is electrically connected to the visual inspection mechanism, the drive component, and the label replacement mechanism.

2. The full-servo label inspection machine according to claim 1, wherein the drive component includes a drive motor, a slider-crank mechanism, a first connecting rod, and a push rod; the slider-crank mechanism includes a crank, a second connecting rod, and a slider; one end of the crank is connected to a power output end of the drive motor, another end of the crank is connected to one end of the second connecting rod; another end of the second connecting rod is connected to the slider; one end of the first connecting rod is connected to the slider; another end of the first connecting rod is connected to a first end of the push rod; the paper pressing roller is mounted on a second end of the push rod;

the frame is provided with a guide rail which guides the movement of the slider; a limiting mechanism is sleeved on the push rod, the limiting mechanism restricts the push rod to only slide along a straight line.

3. The full-servo label inspection machine according to claim 2, wherein the limiting mechanism is a linear bearing which is mounted on the frame.

4. The full-servo label inspection machine according to claim 2, wherein the label removal triggering mechanism includes a pressing block and a spring; the paper pressing roller is connected to the push rod through the pressing block; the spring is sleeved on the push rod; one end of the spring abuts the label removal plate; another end of the spring abuts the pressing block.

5. The full-servo label inspection machine according to claim 1, wherein the waste label traction mechanism includes a waste label unrolling reel and a waste label rolling reel; one end of the label removal paper winds around the waste label unrolling reel; another end of the label removal paper winds around the waste label rolling reel.

6. The full-servo label inspection machine according to claim 1, wherein the label replacement mechanism includes a label replacement traction mechanism and a label replacement plate mounted on the frame; a label replacement paper winds around the label replacement traction mechanism, the label replacement paper is provided with a replacement label; the label replacement plate has an end with a pointed shape, the end with the pointed shape is proximal to the material to be inspected; the label replacement paper travels pass the end with the pointed shape of the label replacement plate;

when the label replacement paper travels pass the end with the pointed shape of the label replacement plate, the replacement label on the label replacement paper is peeled off from the label replacement paper and is adhered to the blank position on the material to be inspected.

7. The full-servo label inspection machine according to claim 6, wherein the label replacement mechanism further includes a sensor disposed near the rear end of the label replacement plate; the sensor is electrically connected to the controller and can detect the blank position on the material to be inspected.

8. The full-servo label inspection machine according to claim 6, wherein the label replacement traction mechanism includes a label replacement unrolling reel and a label replacement rolling reel; one end of the label replacement paper winds around the label replacement unrolling reel; another end of the label replacement paper winds around the label replacement rolling reel.

9. The full-servo label inspection machine according to claim 1, wherein it further includes at least one corrector mounted on the frame; the corrector is provided between the unrolling mechanism and the rolling mechanism.

10. The full-servo label inspection machine according to claim 1, wherein it further includes a slitting mechanism mounted on the frame; the slitting mechanism is provided between the label replacement mechanism and the rolling mechanism.

11. The full-servo label inspection machine according to claim 1, wherein it further includes a human-computer interaction device and a display screen; the human-computer interaction device and the display screen are electrically connected to the controller.

12. A control method for the full-servo label inspection machine according to claim 1, wherein it comprises the following steps:

acquiring image information of a label on a material to be inspected by a visual inspection mechanism; transmitting the image information to a controller;

analyzing and judging the image information by the controller;

pressing a paper pressing roller downwards onto the material to be inspected when the image information corresponds to a defective label so that the defective label adheres to a label removal paper;

activating a label replacement mechanism when a blank position on the material to be inspected is at the label replacement mechanism in order to place a replacement label from the label replacement paper to the blank position on the material to be inspected.

13. The full-servo label inspection machine according to claim 2, wherein it further includes a human-computer interaction device and a display screen; the human-computer interaction device and the display screen are electrically connected to the controller.

14. The full-servo label inspection machine according to claim 6, wherein it further includes a human-computer interaction device and a display screen; the human-computer interaction device and the display screen are electrically connected to the controller.

15. The full-servo label inspection machine according to claim 8, wherein it further includes a human-computer interaction device and a display screen; the human-computer interaction device and the display screen are electrically connected to the controller.

16. The full-servo label inspection machine according to claim 10, wherein it further includes a human-computer interaction device and a display screen; the human-computer interaction device and the display screen are electrically connected to the controller.

17. A control method for the full-servo label inspection machine according to claim 2, wherein it comprises the following steps:
   acquiring image information of a label on a material to be inspected by a visual inspection mechanism; transmitting the image information to a controller;
   analyzing and judging the image information by the controller;
   pressing a paper pressing roller downwards onto the material to be inspected when the image information corresponds to a defective label so that the defective label adheres to a label removal paper;
   activating a label replacement mechanism when a blank position on the material to be inspected is at the label replacement mechanism in order to place a replacement label from the label replacement paper to the blank position on the material to be inspected.

18. A control method for the full-servo label inspection machine according to claim 6, wherein it comprises the following steps:
   acquiring image information of a label on a material to be inspected by a visual inspection mechanism; transmitting the image information to a controller;
   analyzing and judging the image information by the controller;
   pressing a paper pressing roller downwards onto the material to be inspected when the image information corresponds to a defective label so that the defective label adheres to a label removal paper;
   activating a label replacement mechanism when a blank position on the material to be inspected is at the label replacement mechanism in order to place a replacement label from the label replacement paper to the blank position on the material to be inspected.

19. A control method for the full-servo label inspection machine according to claim 8, wherein it comprises the following steps:
   acquiring image information of a label on a material to be inspected by a visual inspection mechanism; transmitting the image information to a controller;
   analyzing and judging the image information by the controller;
   pressing a paper pressing roller downwards onto the material to be inspected when the image information corresponds to a defective label so that the defective label adheres to a label removal paper;
   activating a label replacement mechanism when a blank position on the material to be inspected is at the label replacement mechanism in order to place a replacement label from the label replacement paper to the blank position on the material to be inspected.

20. A control method for the full-servo label inspection machine according to claim 11, wherein it comprises the following steps:
   acquiring image information of a label on a material to be inspected by a visual inspection mechanism; transmitting the image information to a controller;
   analyzing and judging the image information by the controller;
   pressing a paper pressing roller downwards onto the material to be inspected when the image information corresponds to a defective label so that the defective label adheres to a label removal paper;
   activating a label replacement mechanism when a blank position on the material to be inspected is at the label replacement mechanism in order to place a replacement label from the label replacement paper to the blank position on the material to be inspected.

* * * * *